July 26, 1960

K. W. TANTLINGER 2,946,617

SPREADER BAR

Filed June 13, 1958

INVENTOR
Keith W. Tantlinger
BY Albert R. Kirchner
ATTORNEY

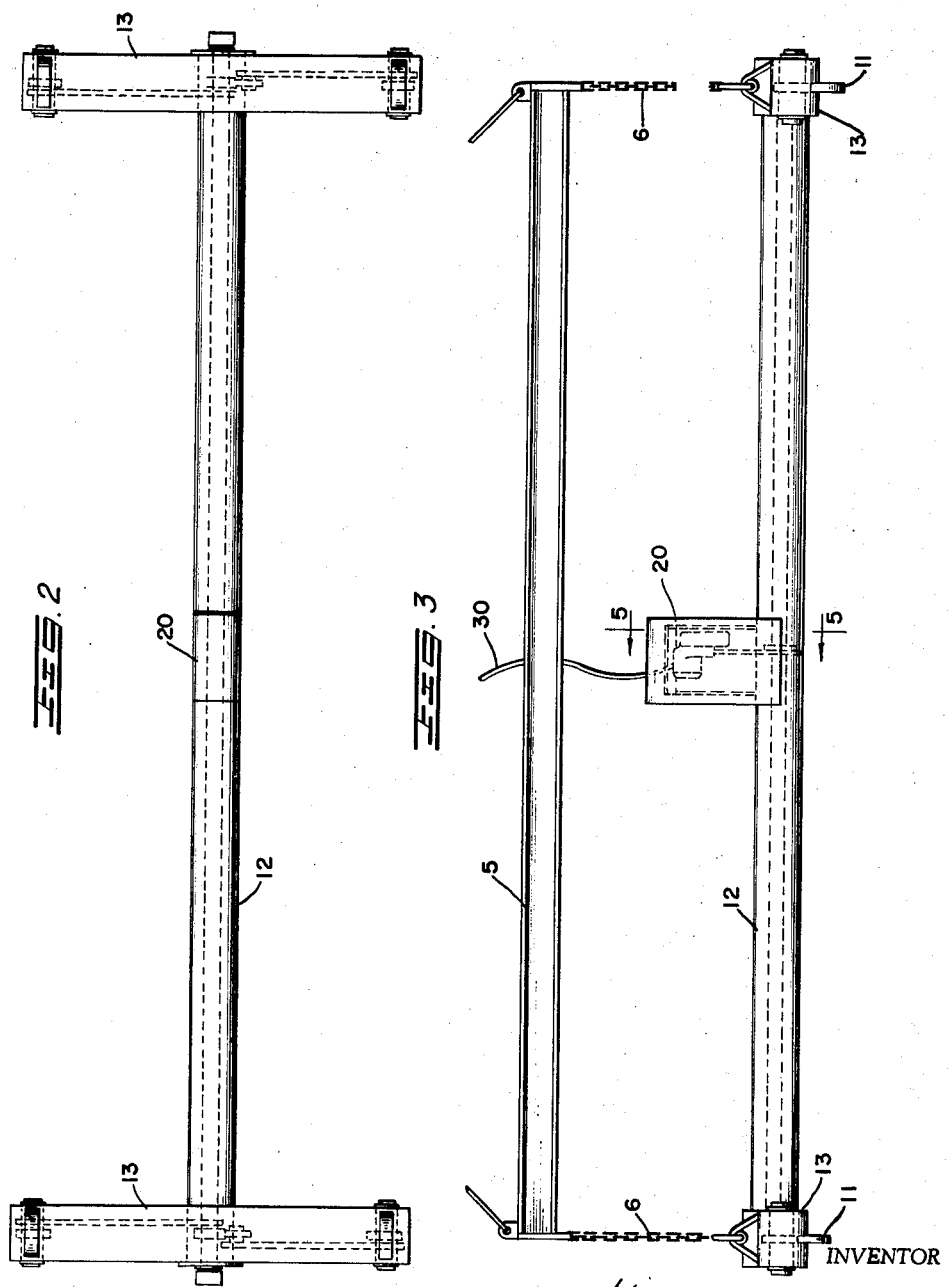

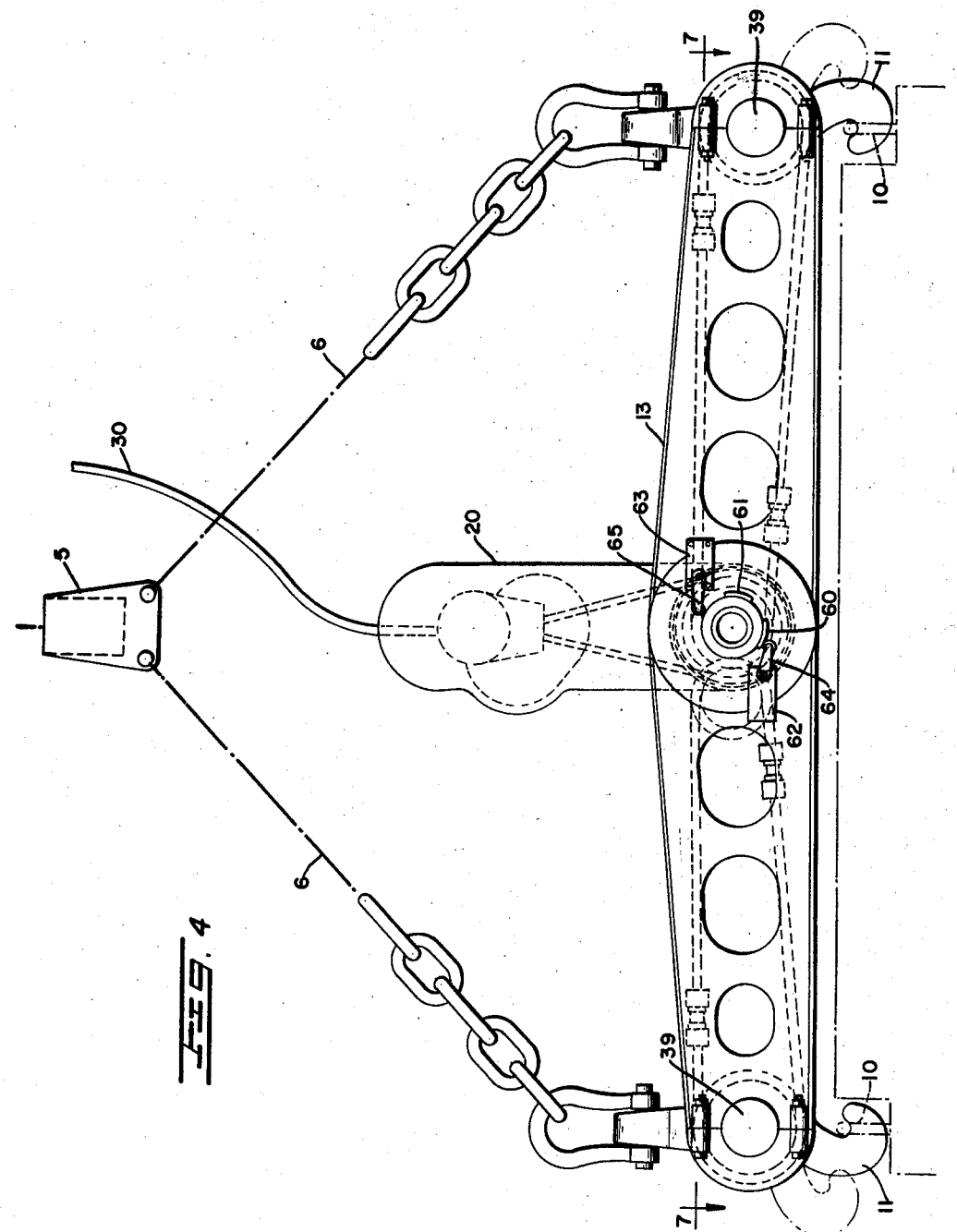

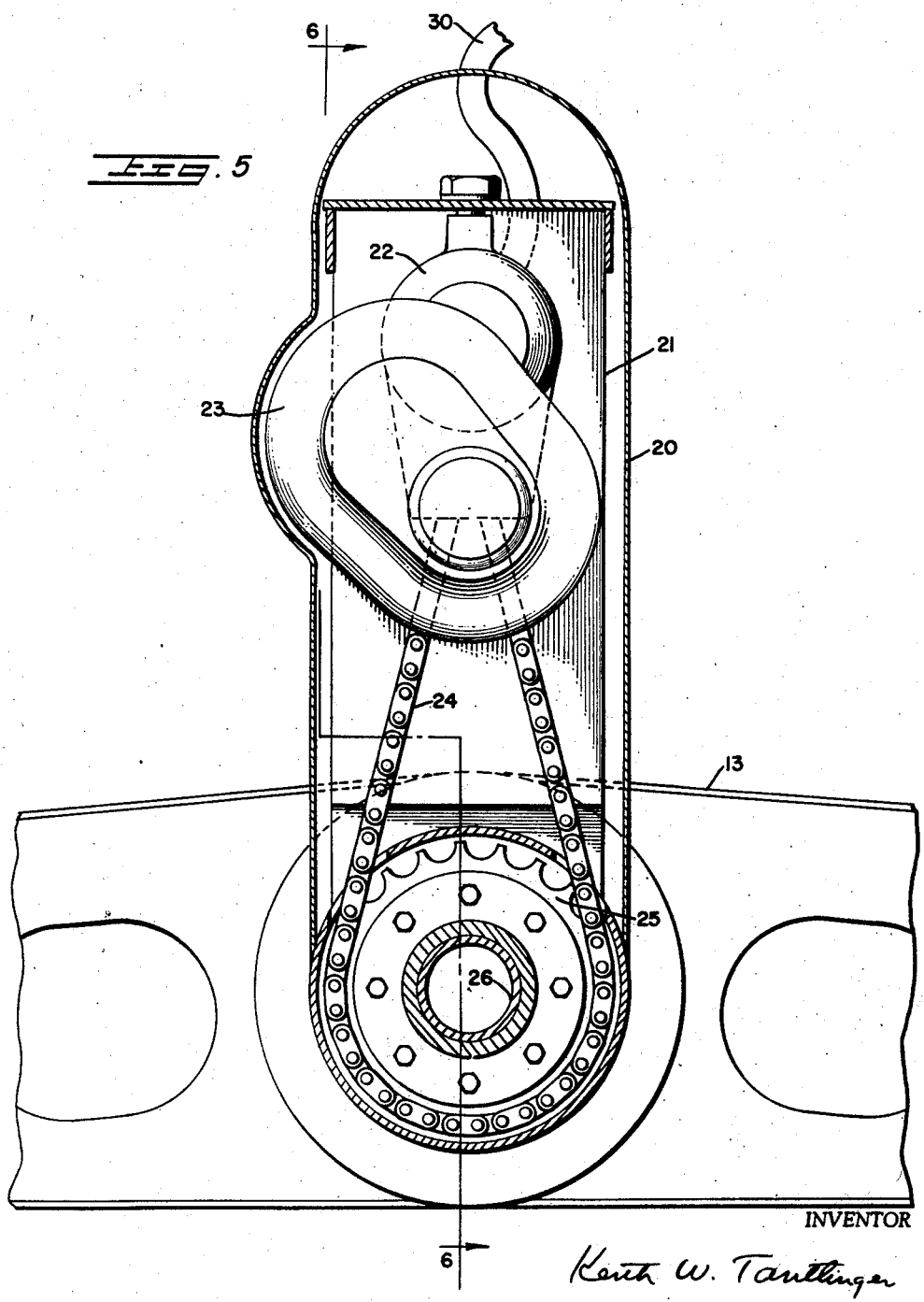

July 26, 1960 K. W. TANTLINGER 2,946,617
SPREADER BAR

Filed June 13, 1958 9 Sheets-Sheet 5

INVENTOR
Keith W. Tantlinger
BY Albert H. Kirchner
ATTORNEY

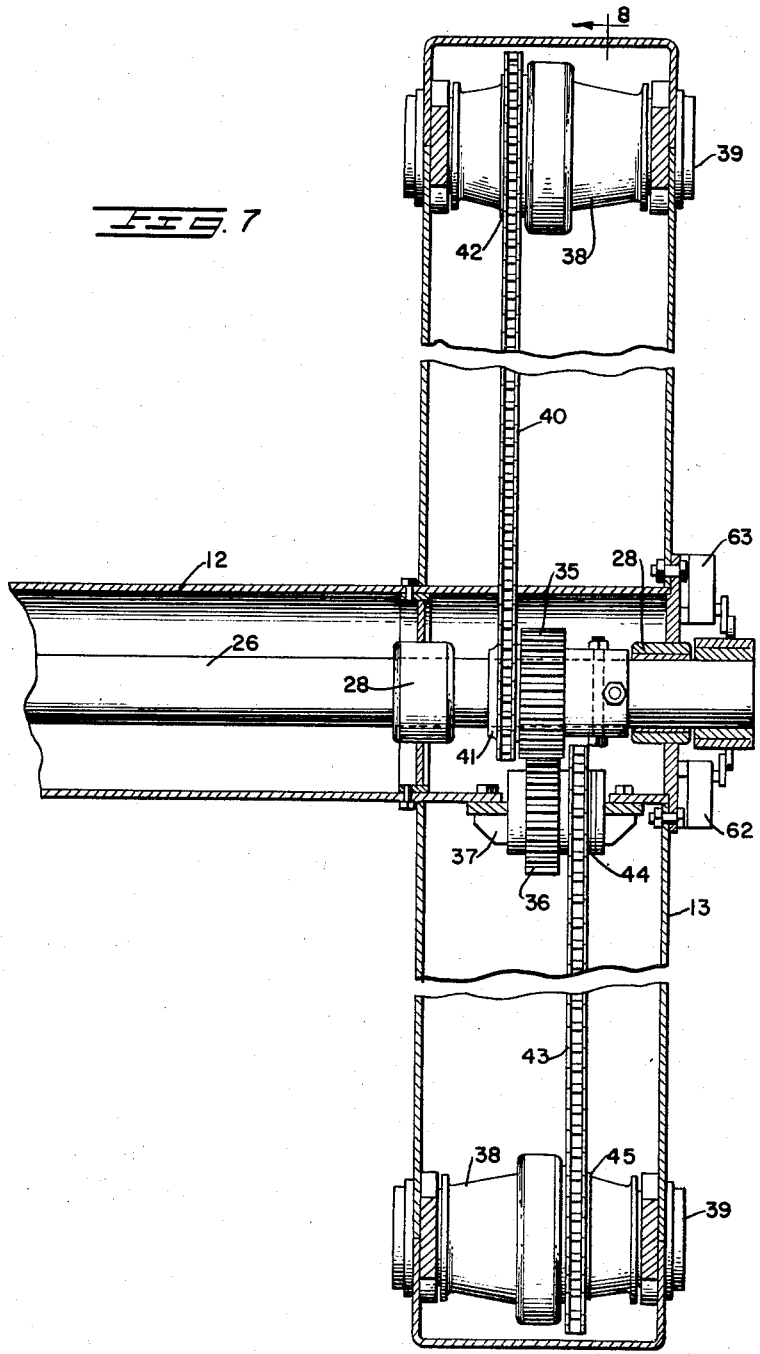

July 26, 1960     K. W. TANTLINGER     2,946,617
SPREADER BAR
Filed June 13, 1958     9 Sheets-Sheet 7
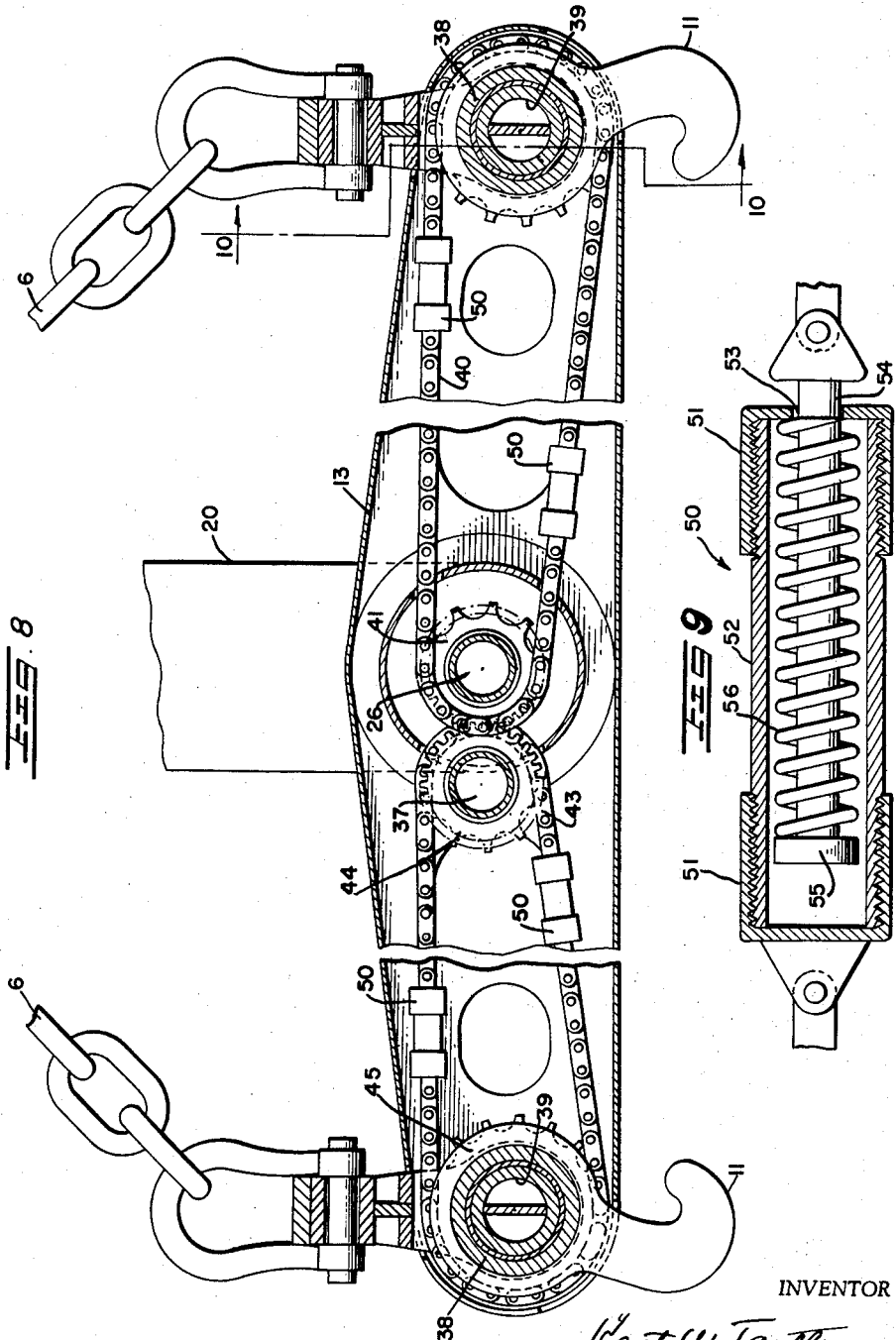
INVENTOR
*Keith W. Tantlinger*
BY *Albert K. Kirchner*
ATTORNEY

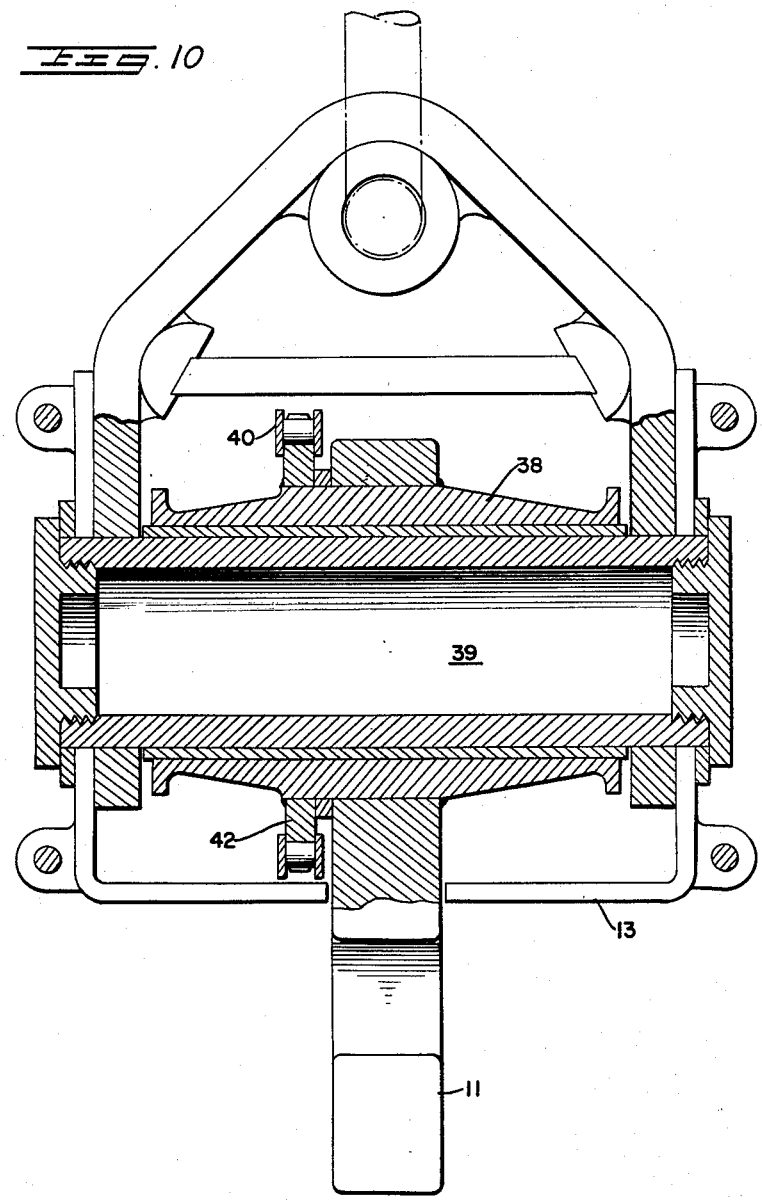

July 26, 1960

K. W. TANTLINGER 2,946,617

SPREADER BAR

Filed June 13, 1958

INVENTOR
Keith W. Tantlinger
BY Albert R. Kirchner
ATTORNEY

United States Patent Office 2,946,617
Patented July 26, 1960

2,946,617

SPREADER BAR

Keith W. Tantlinger, Mobile, Ala., assignor to Pan-Atlantic Steamship Corporation, Mobile, Ala., a corporation of Delaware Filed June 13, 1958, Ser. No. 741,817

5 Claims. (Cl. 294—67)

The present invention relates to lifting and lowering apparatus in the form of a type of grappling means, or more specifically a spreader bar, and more particularly is intended to provide an electrically operated and controlled spreader bar for use in such operations as the transferring of large, bulky unitary loads such as the bodies of highway trucks between dockside and ship.

In the transportation of freight involving successive land and water movement it is economical to employ highway trucks for operation between inland terminals and seaports, in combination with ships for operation between ports. The greatest efficiency is attained by using truck bodies which are detachable from the chassis of the vehicles and transferring the bodies, with their ladings undisturbed therein, from the vehicles to the ships at dockside and/or from the ships to the vehicles. Special constructions of vehicular apparatus and trailerships have been devised for the practice of this type of transportation system, and these structures and the methods of operation involved in their use form the subject of the present applicant's other, copending applications for Letters Patent. The present application is concerned with one of the instrumentalities used in the system—a spreader bar for making quick and effective connection to and disconnection from the truck bodies, hereinafter called boxes, as an incident to their being lifted and lowered by suitable crane means between the vehicle chassis on dockside and the hold or deck of a ship in the dock.

As will, it is believed, be appreciated from the detailed description hereinafter of a preferred embodiment of the invention, various structural and operational requirements must be met by these spreader bars if they are unfailingly and efficiently to perform their functions of making quick and secure connection to the boxes, holding the boxes during movement, accurately responding to the operator's directional controls, quickly releasing the boxes after making exact placement on the marine or land vehicle, etc., all by remote control, and the principal objects of the present invention are to provide a spreader bar that will satisfy all these and all related requirements.

A further object is to provide such a spreader bar as will be extremely rugged and durable in keeping with the heavy work it is called upon to perform, notwithstanding the high degree of accuracy of operation that must be built into the apparatus.

Other and further objects and advantages will be apparent from the following description of the preferred embodiment of the invention which has been actually reduced to practice and found to be entirely satisfactory and which is illustrated in the accompanying drawings, in which—

Fig. 2 is a top plan view of the spreader bar on a scale larger than that of Fig. 1;

Fig. 3 is a side elevational view of the spreader bar and its suspending beam;

Fig. 4 is an end elevational view, on a still larger scale, of the combination shown in Fig. 3;

Fig. 5 is a vertical cross sectional view, on a still larger scale, taken on the line 5—5 of Fig. 3;

Fig. 7 is a horizontal cross sectional view taken on the line 7—7 of Fig. 4;

Fig. 8 is a vertical cross sectional view taken on the line 8—8 of Fig. 7;

Fig. 9 is a detail longitudinal or axial sectional view taken through one of the spring take-up elements of the chain drive for the hooks;

Fig. 10 is a vertical cross sectional view taken on the line 10—10 of Fig. 8.

Figure 1:
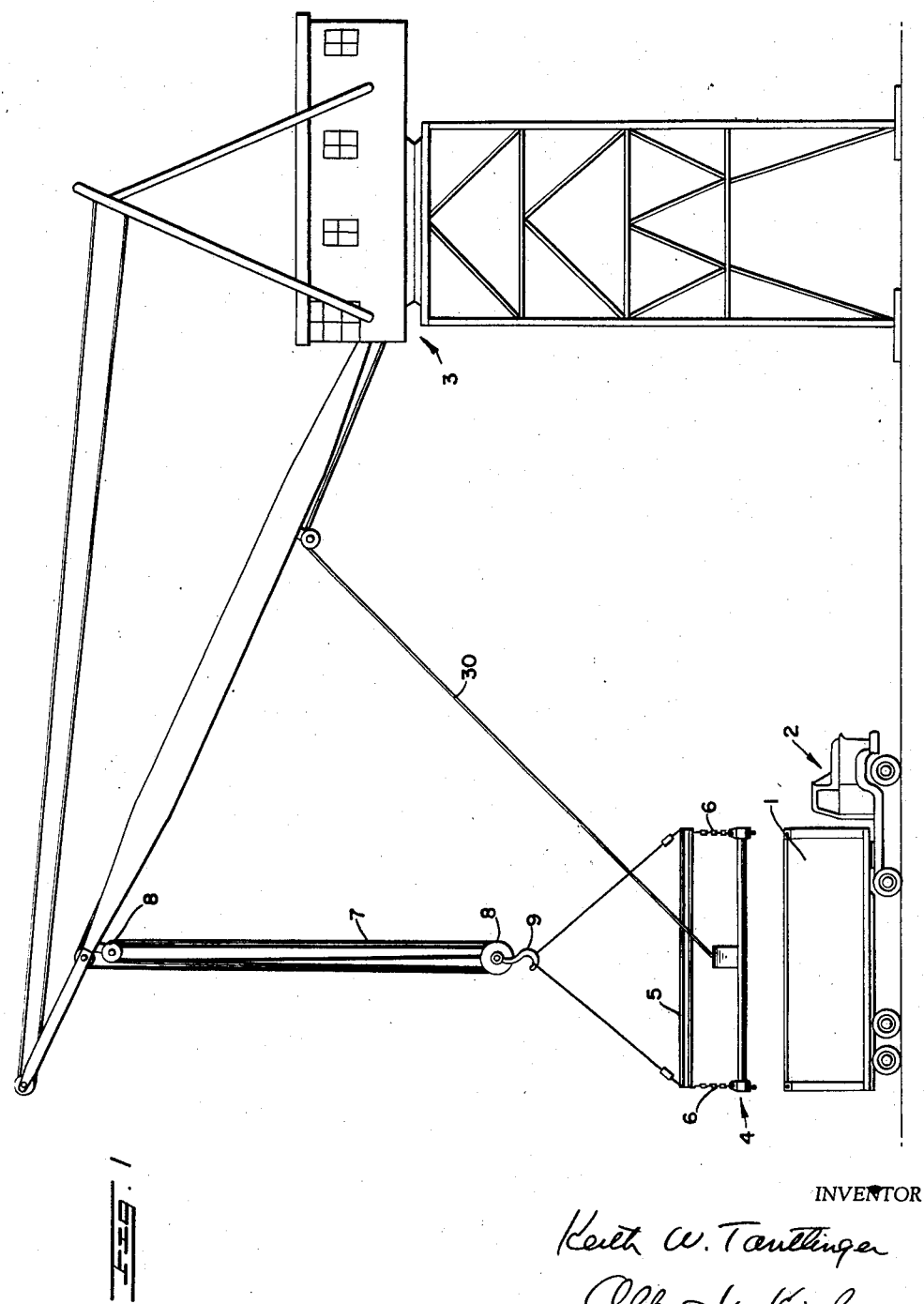
Figure 1 is a diagrammatic side elevational view of a highway truck and lifting crane, showing a spreader bar and its appurtenant apparatus, with the spreader bar in position approaching the truck body or box for making connection therewith.

Generally speaking, the apparatus comprises a central bar, of substantially the length of the box to be handled, having its ends rigid with the centers of a pair of cross arms which are substantially as long as the box is wide and which terminate in four connecting elements, e.g., hooks, for engaging complemental cooperating elements fixed on the four corners of the boxes, in combination, with mechanism integrated with the bar and arms for actuating the hooks or the like for engagement and disengagement with provision for automatically limiting the movements, prevention of overrunning, overloading etc.

In the illustrated example of the invention, the reference numeral 1 designates schematically the demountable "box" of the trailer portion of a tractor-trailer highway vehicle 2 which is to be lifted from its chassis on the trailer and loaded onto a ship (not shown) or other carrier by some such apparatus as the crane 3, and which is in turn to be unloaded from the ship or the like and redeposited on the trailer chassis. The present invention is directed to that portion of the lifting and handling equipment called the spreader bar, which is the element designated generally 4 in Fig. 1 and which is shown more in detail in Figs. 2–8 and 10.

The spreader bar is shown in Fig. 1 suspended from a beam 5 by chains 6 so related to the bar and beam as to assure stable support so that the bar will be held securely against slipping or tilting when the beam is raised, swung and lowered by such rig as the crane 3 with its cable 7, sheaves 8, and hook or eye 9, etc.

Assuming that the box, which is rectangular in plan, is provided at each of its four top corners with a suitable eye or equivalent connecting element 10 (see Fig. 4) suitably inset in the structure and appropriately secured to its framing, the function of the spreader bar is to present a hook or equivalent element 11 for coupling to each of the eyes so that hoisting, lowering, etc. of the bar will carry the box with it for uncoupling movement of the hooks and release of the box after movement to ship's hold or deck, or onto a waiting chassis, or elsewhere as may be desired.

The bar 4 comprises a rigid framework consisting of a main body 12 of about the length of the boxes to be handled, having rigidly secured to each end a cross bar having a length about equal to the width of the boxes and extending equally on opposite sides so that the four hooks 11 will be located in the corners of a shape or area that is rectangular in plan and will substantially register with the four eyes 10 of a box 1 when the bar is lowered into position over the box, as shown in Figs. 1 and 4. The assembly of body 12 and cross bar 13 may be fabricated from steel plate stock riveted and/or welded into a stout integrated framework unit of requisite strength and having a hollow interior for enclosing operating mechanism for the hooks, which will now be described.

Figure 6:
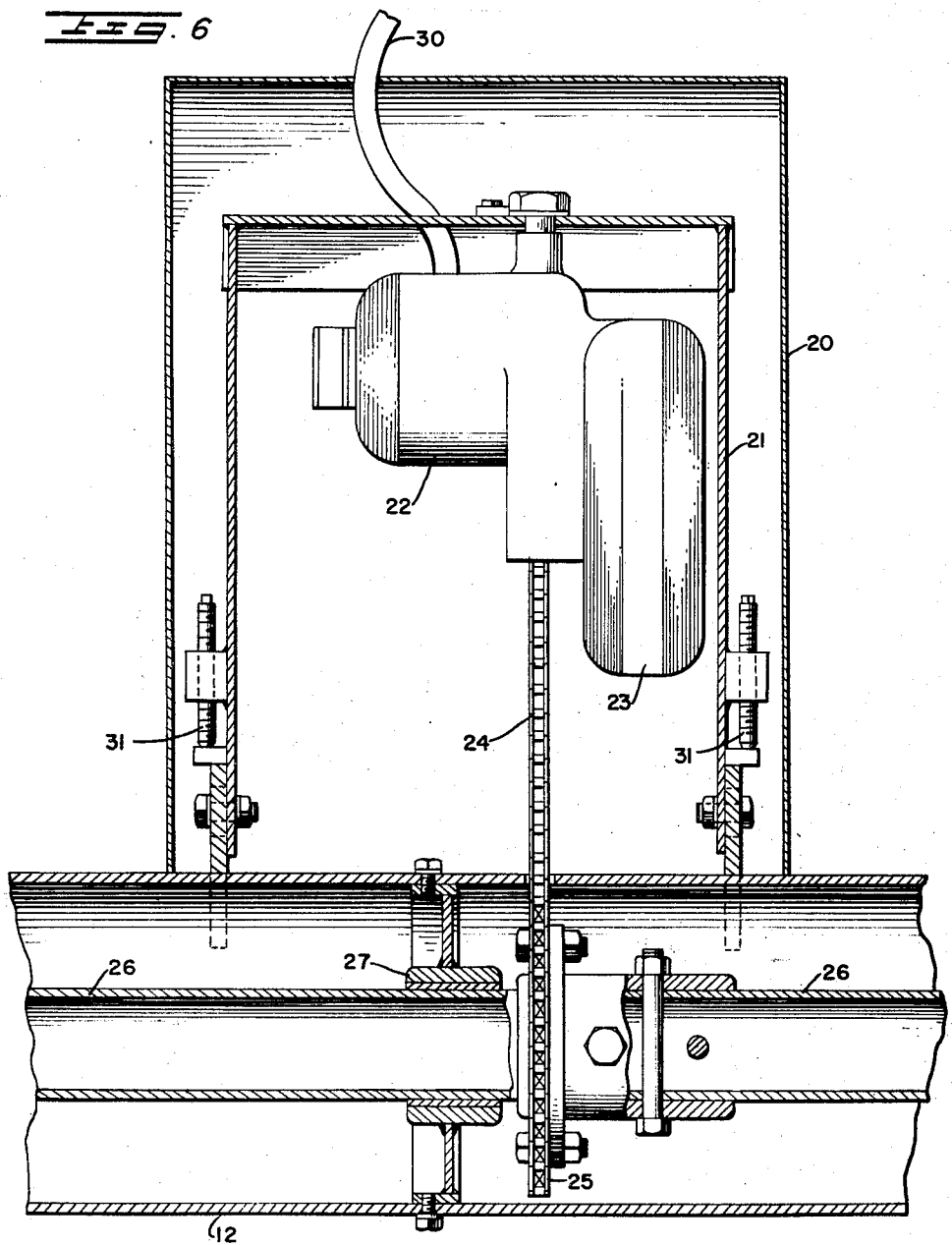
Fig. 6 is a vertical cross sectional view taken on the line 6—6 of Fig. 5.

Upstanding from the center of the main body 12 is a housing 20 enclosing a support 21 for a reversing electric motor 22 and a reduction gear box 23 driving a chain 24 which is sprocketed around a gear 25 fast on a main shaft 26 journaled in a bearing 27 in the central portion of the body 12, as shown in Fig. 6, and in end bearings 28, 28 at the junctions of the body 12 and arms 13, as shown in Fig. 7. The shaft 26 thus extends the full length of the body 12 and is driven by the motor 22, as will be understood. The motor may be supplied by an electric line 30 from the operator's location in the crane cab, and the support 21 may be adjustably mounted on the body 12 by suitable take-up or tensioning means such as shown at 31 in Fig. 6.

Between the end arm bearings 28 at each end of the body 12 the shaft 26 carries a gear 35 which is meshed with a gear 36 in 1 to 1 ratio mounted fast on a stub shaft 37 which is journaled in one of the halves of the end arm 13, as best shown in Fig. 7. In each end of each arm 13 a short hollow rockshaft 38 is journaled on a stout pin 39 and from the center of each of these rockshafts one of the hooks 11 projects through a slot in the arm wall. A sprocket chain 40, engaged over a gear 41 on the main shaft and a gear 42 on one of the rockshafts 38, drives that rockshaft to swing its hook 11, and a similar chain 43 connects a gear 44 on the stub shaft 37 of the gear 36 with a gear 45 on the other rockshaft 38 to rotate that rockshaft and swing its hook 11. It will be noted that the arrangement is such that the two hooks will be swung synchronously, through equal amplitudes and in opposite directions, so that, as viewed in Fig. 8, the hooks will swing simultaneously outwardly, to the broken line position of Fig. 4, or inwardly to the full line position of that figure and as shown in Fig. 8, upon rotation of the main shaft 26 in one direction or the other.

For a purpose hereinafter to be described, each of the chains 40 and 43, at each end of the spreader bar, includes an interposed tensioning take-up device designated generally 50 and shown in detail in Fig. 9. Each consists of a casing enclosing a contractile coil spring which tensions the sprocket chain into which the take-up is interposed and which is yieldable resiliently to permit stretching of the chain within limits. Each device may consist of a pair of end caps 51 one of which is welded to an open link of the chain and is internally threaded for engagement by and adjustable penetration of a tubular casing 52. The other cap 51 is adjustably threaded onto the other end of the casing 52 and is perforated at 53 to pass a stout pin 54 which has its outer end connected to a link in the chain and has its inner end provided with a head 55 serving as an abutment for compressing a coil spring 56 against the perforated cap 51 as the chain is tensioned. The caps 51 can be turned more or less up on the casing 52 to regulate the tension in the spring 56, and hence that of the chain, as will be understood.

Two of the take-up devices are included in each of the end arm sprocket chains, one in each of the two runs thereof as shown in Fig. 8, and their placement is such that neither will come into engagement with either of the gears on which the chain is sprocketed during rocking of the shafts 38 incident to swinging of the hooks through the entire range permitted by the slots 39 and by the limiting means that will now be described.

At one end, as shown in Figs. 4 and 7, the shaft 26 extends out beyond the outer bearing 28, e.g., beyond the cross arm 13 as shown in Fig. 7, and the protruding portion of the shaft is provided with a pair of cam rises 60, 61, as shown in Fig. 4, spaced about 90° apart around the shaft. These rises engage and actuate a pair of limit switches 62, 63 fixed to the adjacent wall of the cross arm and provided with operating arms 64, 65, respectively. The purpose of these switches is to stop rotation of the shaft 26, and hence swinging movement of the hooks 11, automatically at appropriate points in their movement, and this is accomplished by the circuit shown in Fig. 11, which will now be described.

Figure 11:
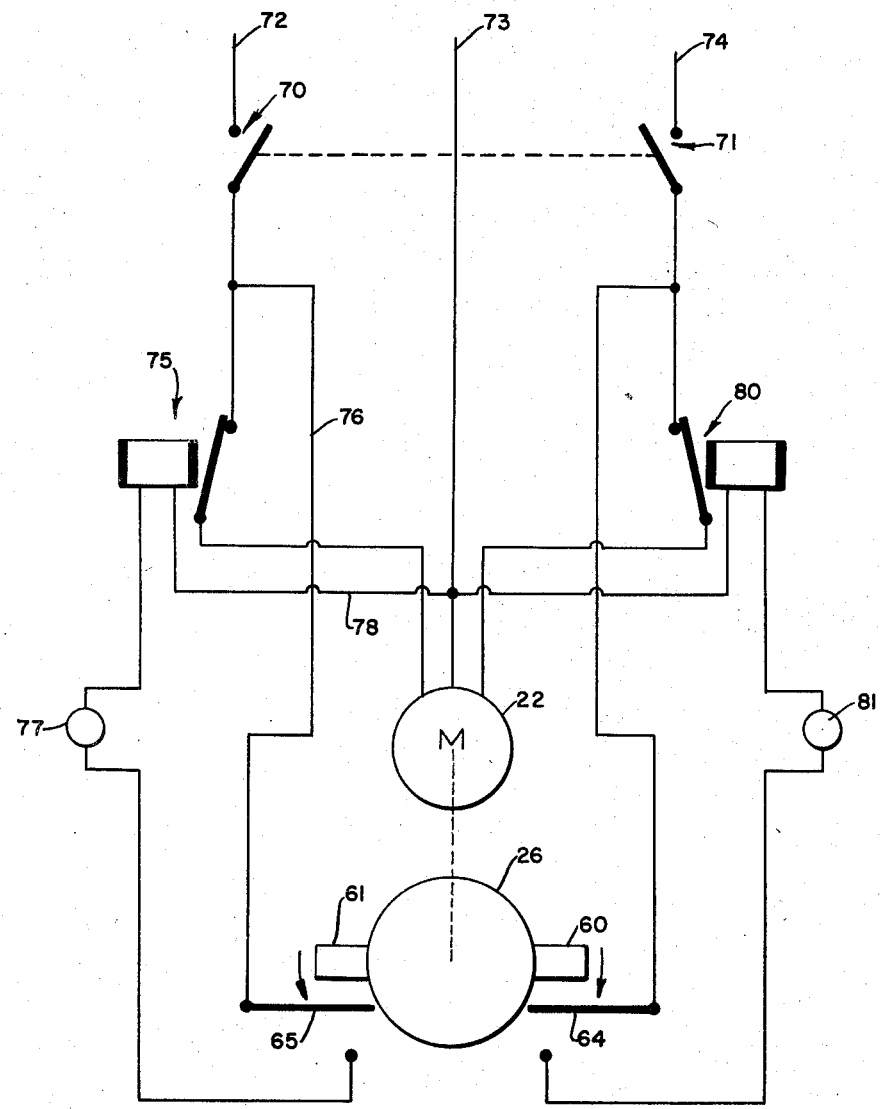
Fig. 11 is a diagram of the electrical circuit for controlling connecting and releasing movements of the hooks.

The operator who may be positioned in the cab of the crane 3, controls the swinging of the hooks 11 by a pair of main switches 70, 71, one for effecting inswinging or engaging movement of the hooks, and the other for outswinging or releasing movement thereof. The two switch handles may be connected, or they may constitute together a well known type of double throw switch, so that both switches cannot be closed at the same time. As has been explained, the motor 22 is a reversing motor. Let it be assumed that closing the switch 70 energizes the motor to rotate the shaft 26 counterclockwise as seen in Figs. 11 and 4, and that closing the switch 71 energizes the motor to rotate the shaft in a clockwise direction as seen in these figures. The motor is supplied, from the mains 72, 73, 74, upon closing the switch 70, through the normally closed relay 75 and turns the shaft 26 counterclockwise, swinging the hooks 11 from the full line position of Fig. 4 toward the broken line position thereof until the cam rise 61 engages limit switch arm 65 and closes that switch, energizing the coil of relay 75 through line 72, switch 70, line 76, switch arm 65, signal lamp 77 in the operator's cab, the coil of relay 75, and lines 78 and 73. Energization of relay coil 75 opens the switch of the relay and thus stops the motor. The hooks remain in their broken line position of Fig. 4, i.e., in expanded or releasing position, separated from the eyes 10 of a box 1, and signal light 77 remains lit to show the operator that the hooks are in this disengaged position.

To swing the hooks reversely, into engaging position as shown in full lines in Fig. 4, the operator closes main switch 71, at the same time automatically opening switch 70. Current then flows from main 74 through the normally closed switch contacts of relay 80 to main 73, through the motor 22, to turn the motor in a reverse direction, i.e., so as to rotate the shaft 26 clockwise as seen in Fig. 11 until cam rise 60 engages limit switch arm 64 to close that switch, while the hooks 11 are swinging inwardly from their broken line positions of Fig. 4 to their full line positions in this figure, i.e., from releasing to engaged position. Closing the limit switch 62 by engagement of the cam rise 60 with the arm 64 of that switch energizes the coil of relay 80 to open its switch and stop the motor 22. The hooks 11 are now in their full line position of Fig. 4, i.e. fully moved to engaging position, and they remain in this position with the signal light 81 lit, until the operator closes the switch 70 to swing the hooks in the opposite direction.

The motor 22 includes the usual overload cutout (not shown) to open the circuit responsive to excessive load in order to prevent damage to the motor. Overloading may occur if, in swinging toward engaging position, the hooks strike some solid obstacle, such as the surface of the box or the ring of the eyes. In such cases the stopping of the hook movement is of course abrupt. However, because of the stretching of the chains 40 and 43 resulting from yield in the take-up devices 50, the load on the motor is a gradually increasing one which builds up to cutout-operating value. This is one important function of the take-up devices. Another is concerned with the normal operation of the hooks. The limit switches are so positioned that, in swinging to engaging position, the hooks ride slightly past their dead centers in the eyes 10 before the limit switch 62 stops their movement. Thereafter, on lifting of the bar, the hooks move slightly outwardly, settling at dead center as the weight of the load being hoisted becomes imposed on them. The take-up devices accommodate this slight reverse movement of the hooks without requiring any reverse movement of the shaft 26 or the motor 22 or imposing any undue strain thereon. Moreover, adjustment of the take-up devices relatively to each other permits the hook positions to be properly calibrated so that the hooks will move in and out in proper synchronism to engage and release the eyes all at the same time.

The embodiment of the inventive principles which has been shown and described in this application is one that is presently preferred. Modifications and substitutions of equivalents are contemplated within the spirit of the invention and within the scope of the broader of the appended claims.

I claim:

1. A spreader bar comprising a rigid framework, a load-engaging element rotatably mounted at each of four points on said framework comprising the corners of a shape that is rectangular in plan, a driving gear coupled to each of said elements, power means for operating said elements comprising a motor mounted on the framework, a shaft driven by the motor extending along the framework and having gears at its end portions, chains trained over said gears and over each of said load-engaging element driving gears, and a yieldable take-up device interposed in each of said chains including a resilient element operative normally to keep the chains tensioned about said gears and stretchable under load, whereby said load-engaging elements may be rotated beyond load-engaging terminal positions with stretching of the take-up devices and may thereafter, upon lifting of the spreader bar and a supported load, rotate reversely with contraction of the take-up devices without rotation of the shaft.

2. A spreader bar as claimed in claim 1, in which each of the chains has two take-up devices, one in each run of the chain between the two gears over which the chain is trained.

3. A spreader bar as claimed in claim 1, in which each of the chains has two take-up devices, one in each run of the chain between the two gears over which the chain is trained and in which the movement of the chains between terminal positions is insufficient to advance any of the take-up devices into engagement with any of the gears.

4. A spreader bar as claimed in claim 1, including limit switch means mounted on an end portion of the shaft for stopping rotation of the shaft and rotation of the load-engaging elements at substantially terminal positions of the load-engaging elements.

5. A spreader bar as claimed in claim 1, including limit switch means mounted on an end portion of the shaft and cooperating with the take-up devices to stop rotation of the shaft and of the load-engaging elements upon movement of said elements slightly beyond their terminal positions, so that upon imposition of a load on said elements consequent upon hoisting of the spreader bar with a supported weight said elements may rotate reversely with contraction of the take-up devices and without rotation of the shaft.

References Cited in the file of this patent

UNITED STATES PATENTS

| | | |
|---|---|---|
| 1,270,995 | Weickel | July 2, 1918 |
| 1,295,163 | Henricks | Feb. 25, 1919 |
| 1,432,997 | Graham | Oct. 24, 1922 |
| 1,652,013 | Jones et al. | Dec. 6, 1927 |
| 1,706,211 | Coffey | Mar. 19, 1929 |
| 1,819,017 | Drake | Aug. 18, 1931 |
| 1,822,629 | McIlvried | Sept. 8, 1931 |
| 1,968,135 | Fildes | July 31, 1934 |
| 1,975,557 | Shafer | Oct. 2, 1934 |
| 2,030,863 | Fitch | Feb. 18, 1936 |
| 2,052,559 | Fitch | Sept. 1, 1936 |
| 2,097,133 | Richardson | Oct. 26, 1937 |